United States Patent [19]

Franzmeier

[11] 4,043,527

[45] Aug. 23, 1977

[54] HEATING CABLES

[76] Inventor: Alvin W. Franzmeier, 1042 E. Jenks, St. Paul, Minn. 55104

[21] Appl. No.: 685,783

[22] Filed: May 13, 1976

[51] Int. Cl.² ............................................. F16L 3/08
[52] U.S. Cl. ........................................ 248/65; 52/11; 248/48.2; 248/73; 219/213
[58] Field of Search ....................... 248/48.1, 48.2, 65, 248/72, 73, 237, 223, 301; 52/11, 15, 16, 24, 25, 173; 219/213; 138/33, 35; 61/15

[56] References Cited

U.S. PATENT DOCUMENTS

| 371,665 | 10/1887 | Brinkerhoff | 248/301 X |
|---|---|---|---|
| 2,688,457 | 9/1954 | Hammarstrom | 248/48.1 |
| 3,074,676 | 1/1963 | Watson | 248/301 X |
| 3,181,827 | 5/1965 | Sassin | 248/237 X |
| 3,295,803 | 1/1967 | Blayden | 52/11 X |
| 3,341,158 | 9/1967 | Landis | 248/48.2 |
| 3,599,916 | 8/1971 | Szabo | 248/73 |
| 3,737,127 | 6/1973 | Maloney et al. | 248/48.2 |
| 3,823,304 | 7/1974 | Siemianowski | 219/213 |

FOREIGN PATENT DOCUMENTS

122,203 6/1971 Norway ................. 219/213

OTHER PUBLICATIONS

Chromaloy Thermwire Advertisement, Edwin L. Wiegand Co., Bulletin 1000.

*Primary Examiner*—Roy D. Frazier
*Assistant Examiner*—Rodney H. Bonck
*Attorney, Agent, or Firm*—Jacobson and Johnson

[57] ABSTRACT

Heating cables are secured in proper position by supports extending into the rain gutter of the house or building. In new installations, these supports may extend across the gutters and support the outer wall thereof in addition to serve as an anchoring means for heating cables. The construction is such that the supports serve as a means of supporting heating cables extending longitudinally of the gutter and in spaced relation to the bottom of the gutter. The supports may also serve as anchors for zig zag cable portions of a heating cable overlying the edge portion of the roof.

4 Claims, 12 Drawing Figures

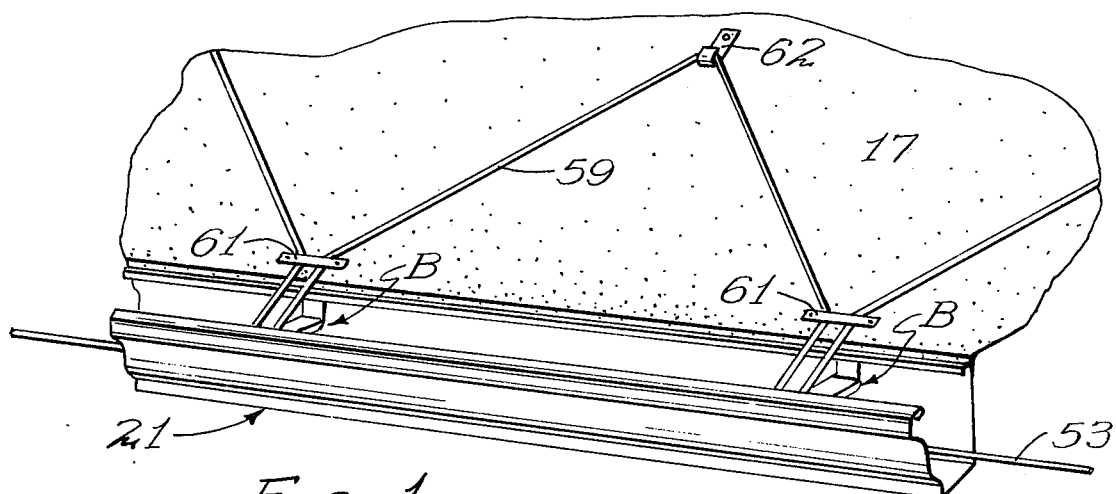
FIG. 1
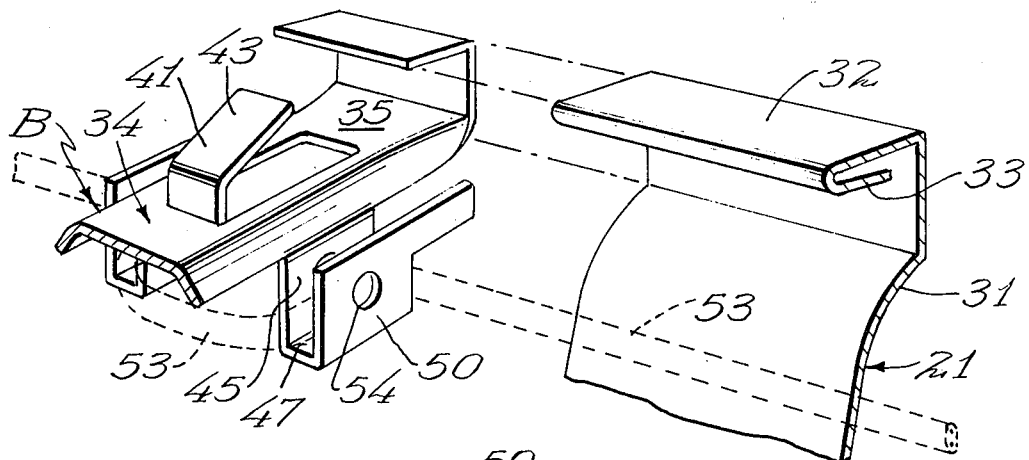
FIG. 2
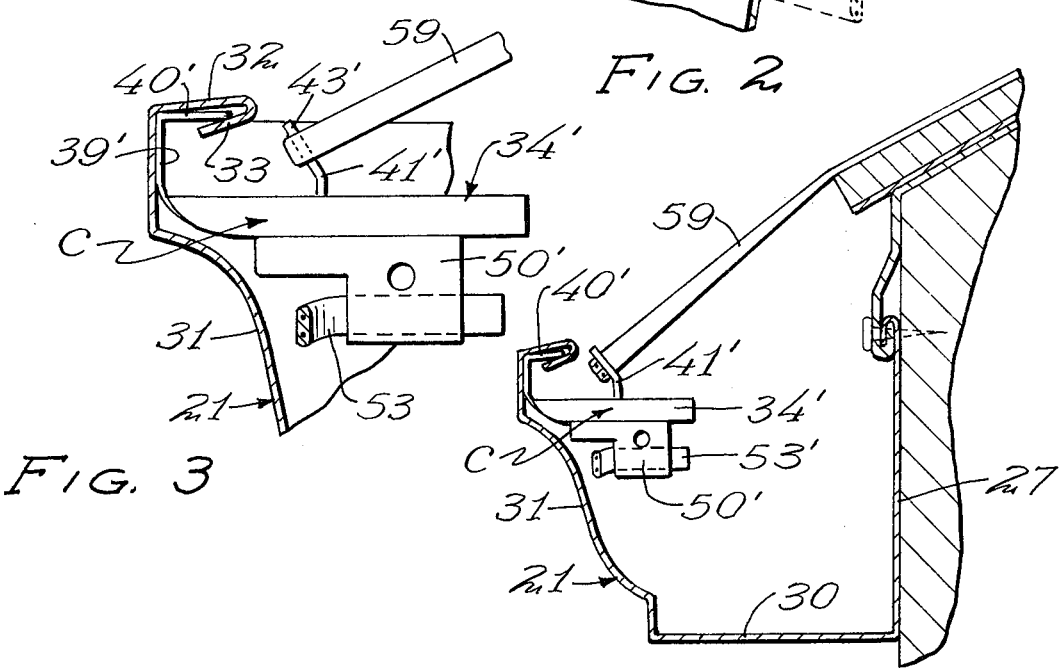
FIG. 3
FIG. 4

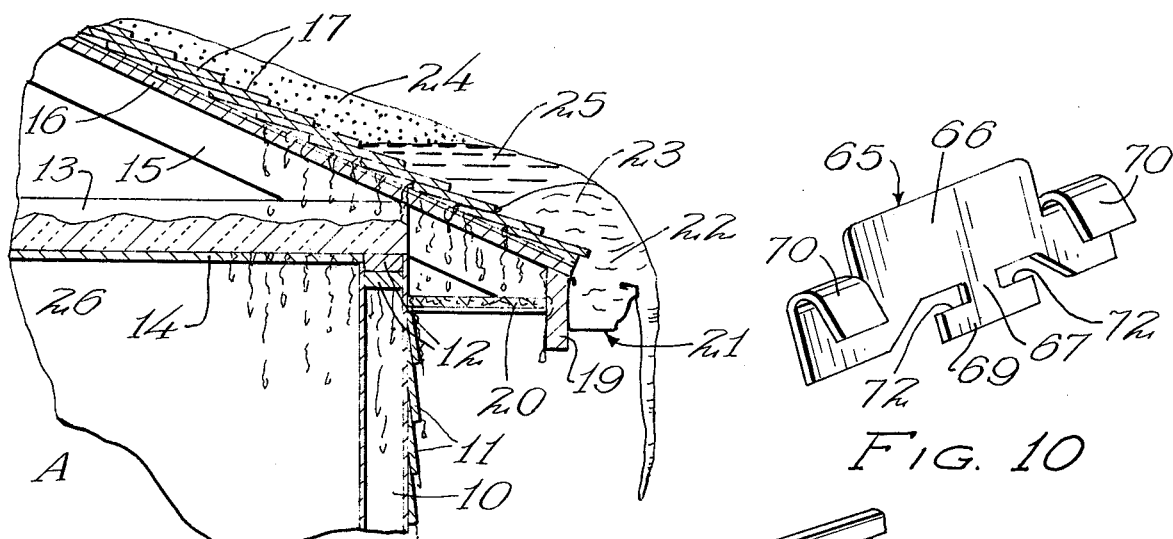
FIG. 8
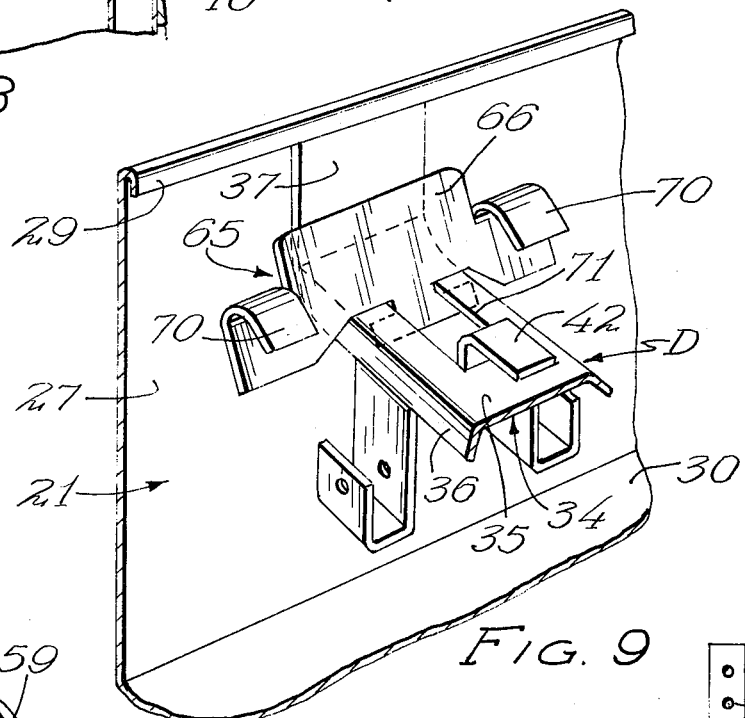
FIG. 10
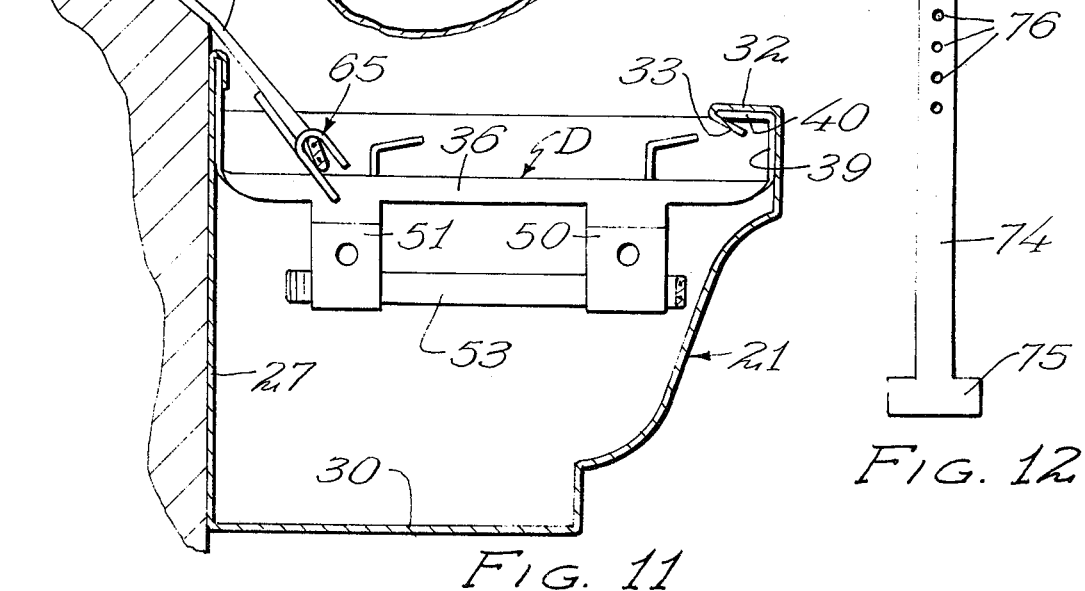
FIG. 9
FIG. 11
FIG. 12

HEATING CABLES

This invention relates to an improvement in Heating Cables and deals particularly with cables which are designed to lie on the roof during cold weather seasons.

Many sorts of devices have been designed for keeping the rain gutters free of freezing during cold weather. This has been found somewhat difficult in the northern parts of the country in which under normal circumstances, the heat given off by the cable is not sufficient to cause the drain to flow.

A feature of the present invention lies in the provision of a heating cable support which may extend transversely across the rain gutter at longitudinally spaced points, and which may be used to support the heating cable. Where the structure is used as a rain gutter support as well as the heating cable support, the support extends completely across the rain gutter from one side to the other thereof. Where the supports are used in conjunction with gutters which have been previously installed, the supports may extend into the gutters from one side or the other thereof.

It has been found that in many cases the rays of the sun striking the roof will often thaw the ice and snow overlying the gutters causing the rain gutters to gradually fill up with ice, particularly where the downspouts are also frozen with ice. When the gutters become filled, the further thawing of ice and snow during the warm portions of the day forms an ice dam completely covering the rain gutters and the edge portion of the roof. This causes a backup of ice and snow which extends considerably above the level of the drain pipes. When this ice and snow melts due to the rays of the sun, the water tends to flow between the shingles and to drain into areas of the attic or ceiling, loosening the plaster and causing considerable damage to the supporting walls.

In order to avoid this difficulty, heating cables have been provided which are inserted into the rain gutters in the fall of the year before the snow and ice are present. Unfortunately, these heating cables normally rest at the bottom of the rain gutters so that a substantial percentage of the heat given off by the cable is conducted to the metal gutters and do not prevent the difficulties which were experienced without such cables.

SUMMARY OF THE INVENTION

The present invention can be used in conjunction with new gutter installation. In the preferred form of the invention my heating cable support may be used with one or two heating cables depending upon the usual weather conditions experienced in that area. Two different cable systems are preferable in countries where they are applicable so that the two systems may be used separately when desired. In other words, if there is no ice build up extending to near the top of the rain gutter and on the adjoining portions of the eaves, the single cable extends from one hanger to another spaced longitudinally of the rain gutter. This heating cable is supported well above the bottom surface of the gutter so that the metal of the gutter does not absorb most of the heat from the heating cable, and only engages limited areas of the cable hangers. While a cable of this type does not prevent a small build up of ice in the lower portions of the gutter, this is not particularly objectionable, particularly where the rain gutter is provided with two outlets, one well above the surface of the eaves and through which the water may leave. Such a dual outlet is illustrated in my co-pending application Ser. No. 631,819 filed Nov. 14, 1975 and entitled Rain Gutter Attachment.

The second cable is designed to form a channel through the ice dam overlying the gutter and the adjoining portions of the eaves. This second cable is designed to be secured to the gutter hangers and extends upwardly to the eaves and then diverges outwardly and upwardly over the surface of the roof to form generally Y-shaped passages at spaced intervals along the length of the rain gutter. This cable cooperates with the first named cable so that water and snow from the roof may flow along spaced parallel channels into the gutters. Thus, while the second heating cable does not remove all of the ice and snow from the roof and portions overlying the rain gutter, it does allow the snow and water overlying the portions of the eaves adjoining the wall of the house to be drained into the rain gutter, and thereby escape to prevent the damage which previously existed.

Here again it should be understood that the means supporting the heating cables may either extend completely across the rain gutter, or may extend into the rain gutters from either side thereof.

These and other objects and novel features of the present invention will be more fully and clearly set forth in the following specification and claims.

BRIEF DESCRIPTION OF THE DRAWINGS

FIG. 1 is perspective view of a portion of the eaves of the house showing a portion of the heating cables attached thereto.

FIG. 2 discloses in an exploded form, a portion of the outer side of the gutter and a portion of the heating cable support attached thereto.

FIG. 3 is a sectional view through the other side of the rain gutter showing the cable support attached to the outer surface of the rain gutter.

FIG. 4 is a view similar to FIG. 3 but showing a complete section of the gutter and a portion of the eaves.

FIG. 8 is a diagrammatic view in section through a portion of the rain gutter, the roof and the ceiling, showing the cause of damage when ice builds up in the rain gutter.

FIG. 9 is a perspective sectional view indicating the manner in which the hangers may be supported in a manner somewhat different from the manner shown in FIGS. 1 to 7.

FIG. 10 is a perspective view of the seperate hanger piece indicated in FIG. 9.

FIG. 11 is a sectional view through the rain gutter showing the hanger illustrated in FIGS. 9 and 10.

FIG. 12 is a modified form of hangers support.

DESCRIPTION OF THE PREFERRED EMBODIMENTS

Figure 5:
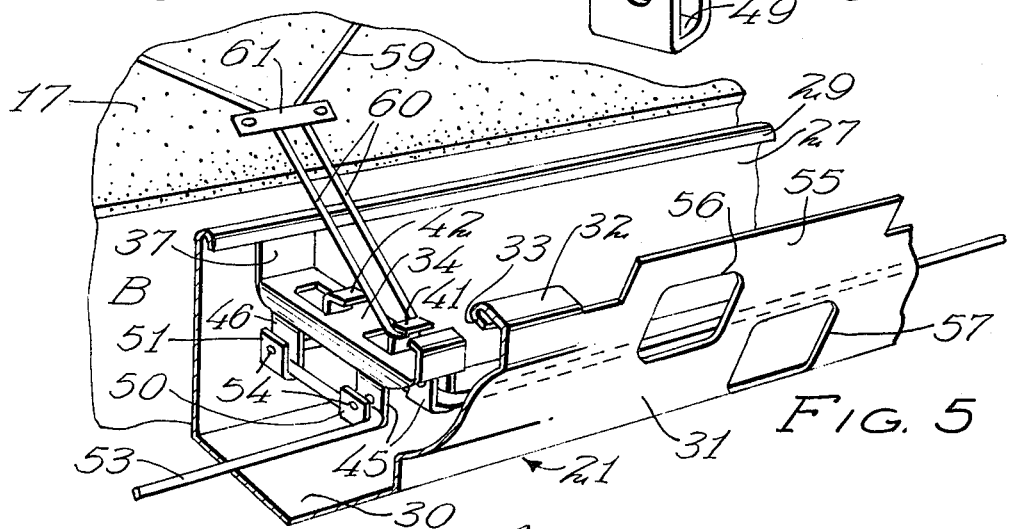
FIG. 5 is a perspective view of a portion of the rain gutter, portions of which have been broken away to disclose the cable support.

Perhaps the difficulty which has been experienced in the past, and which the applicant is attempting to correct with this construction in FIG. 8 indicates a house or building A having an outer wall 10 externally covered by siding or the like indicated at 11. The wall 10 is usually formed of spaced members such as two by fours, and the upper ends are connected by members 12. The members 12 support spaced rafters 13 which support the ceiling 14. Roof supporting rafters 15 are supported by the members 12 and normally covered by roof panels 16 over which overlapping shingles 17 are secured. A facia 19 connects the lower ends of the rafters 15 and extends vertically parallel to the wall 10. A soffit 20 extends from the side wall to the facia 19. A rain gutter 21 has its inner wall connected to the facia 19 and is designed to catch water draining from the roof 16. As indicated in this figure, the rain gutter 29 normally fills with ice and further water draining down the roof tends to form an ice dam 23. As will be understood, snow and water from the snow blanket 24 overlying the roof tends to melt from time to time and is prevented from entering the rain gutter 21 by the ice dam 23. This build up of snow and water indicated at 25 tends to permit the water to seep between the shingles causing water to drain upon the soffit 20 and also into the insulation 26 normally overlying the ceiling 14. When the insulation 26 becomes soaked with water, it will normally rest upon the ceiling 14 and gradually seep through the ceiling either seriously damaging the plaster or other substance forming the ceiling and obviously causing discoloration thereof. In order to avoid this difficulty, there are heating cables which may be provided. As indicated in FIG. 5 of the drawings, the rain gutter 21 includes an inner wall 27 provided at its upper edge with a downturned flange 29. The rain gutter 21 also includes a bottom panel 30 which supports an outer wall 31 which is curved to provide an attractive appearance. An inturned flange 32 extends inwardly from the upper edge of the outer wall 31 and is connected to a hook flange 33 beneath the same. To this point, the structure described is common practice.

Figure 6:
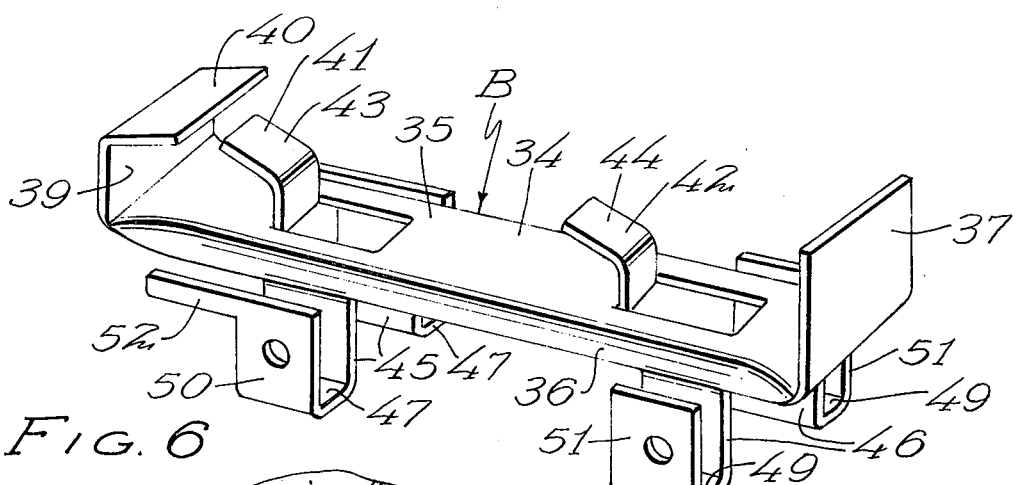
FIG. 6 is a perspective view of the cable support shown in FIG. 5.
Figure 7:
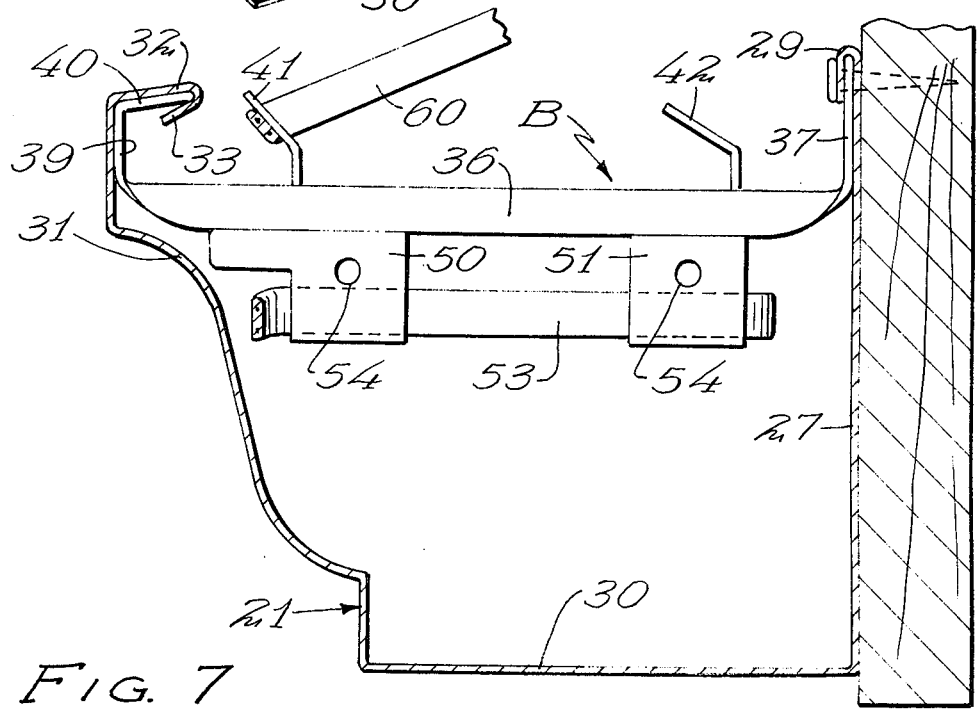
FIG. 7 shows a support in conjunction therewith.

The hangers B which are perhaps best shown in FIGS. 5 to 7 may serve a double purpose of supporting the outer wall 31 of the rain gutters and also supporting one or more cables. When used in new installations, they extend entirely across the rain gutters while the hangers used on existing gutters can either extend outwardly from the inner wall or inwardly from the outer wall. As indicated, the hangers B include an elongated channel shaped body 34 and includes a flat top portion 35 and downwardly extending sides 36, the main purpose of this arrangement being to increase the strength. One end of the flat top portion 35 is provided with an upwardly extending flange 37 designed to extend along the surface of the inner wall 27 of the rain gutter and to extend between this wall and the downturned flange 29. The other end of the flat top 35 is provided with an upwardly extending flange 39 which supports along its upper edge an angularly extending flange 40. As shown in FIG. 7 of the drawings, the upright flange 39 extends along a vertical portion of the outer wall 31 of the rain gutter 21, and the flange 40 extends between the inturned flange 32 of the front wall and the reversely turned flange 33. Hooks 41 and 42 are cut into the upper surface 35 of the hanger B, and are bent to extend toward the outer end of the hanger, the end portions 43 and 44 of these hooks being spaced from the flat surface 35 a distance sufficient to accommodate the heating cable therein. Downward projections 45 and 46 extend downwardly from the side walls 36 of the channel-shaped member 34 and support coplanar outwardly extending flanges 47 and 49 extending substantially parallel to the upper surface 35 of the channel 34. Coplanar portions 47 and 49 support upwardly extending flanges 50 and 51 providing channels between the flanges 45 and 46 and the corresponding flanges 50 and 51. The flanges 50 may be provided with projecting arms 52, (see FIG. 6) as will be clear from FIG. 5 of the drawings. The various flanges described are to accommodate a heating wire 53 which extends through one channel formed by spaced parallel flanges 45 and 50. The cable 53 extends longitudinally of the hanger through the notch formed between the flanges 46 and 51. It then extends transversely of the hanger to be inserted between the second pair of flanges 46 and 51 and then through the notch formed between the flanges 45 and 50 at the other end of the hanger. The purpose of this arrangement is not only to provide an increased area of heat along the hanger B, but also to prevent the cable from movement longitudinally of the rain gutter. If desired, holes 54 may be provided through the J-shaped cable supports extending from the hanger body 34. These holes 54 being designed to accommodate a metal screw or a bolt to ensure the cable 53 from becoming disengaged from the bracket.

In the manner described in my previous application, above referred to, a portion of the front wall 31 of the gutter 21 is flattened as indicated at 55 and two apertures 56 and 57 are provided in this flattened area to direct the fluid to side by side downspouts not shown in this application. As indicated in FIG. 5 of the drawings, a heating cable 59 is hooked around one of the hooks 41 or 42, and portions of this cable indicated by the numeral 60 extend in parallel relation over the edge of the roof 17 and are anchored in this position by an anchoring clip 61. As shown in FIG. 1 of the drawings, the heating cable 59 is hooked over hooks 62 on the roof 17, and extend in a zig zag arrangement along the edge of the eaves. By supplying current to the heating cable 59, grooves or tunnels will be formed through any buildup of such snow and ice so that water may drain from above the ice dam indicated at 23 in FIG. 8 to the rain gutter. The other cable 53 normally forms a passage longitudinally of the rain gutter. In any event, the heating cables form tunnels or channels through which water may flow into the rain gutter, and even if the gutter freezes solid throughout most of its length, the heating wire 59 forms channels which prevent the snow and water buildup (FIG. 8) above the ice dam 23. FIGS. 3 and 4 show a construction similar to that described, but in which the changer C is supported by the outer wall of the rain gutter 21. The structure is very similar to that which has been described with the exception of the fact that the channel-shaped member 34 extends only about half way or somewhat less across the width of the rain gutter. The hanger C is held in place by the engagement of the flange 40' between the flanges 32 and 33 and by the pull of the heating cable 59 upon the hook 41. This type of hanger is obviously considerably less expensive than the hanger B, but its use depends upon the direction of pull of the heating cable 59 upon the hook-shaped member 41'.

The hanger D which is shown in FIGS. 9 and 11 of the drawings is identical to the hanger B which has been described, and accordingly the same identifying numerals have been used. The difference between the hanger B and the hanger D lies in the fact that an extra bracket 65 is supported in the hanger D so that the heating wires 59 may extend upwardly almost vertically from the hanger. Therefore, this construction may be used where the roof is unusually steep or where it is at least desirable that the heating cables extend almost vertically from the body of the hanger. The upward pull upon the bracket 65 draws the flange 37 tightly into the groove between the rear wall 27 and the downturned flange 29. The bracket 65 includes a flat panel 66 from the lower surface of which extends a T-shaped projection having a stem portion 67 and a cross member 69 which is of considerably greater width than the stem 67. The end portions of the body portion 66 are slit and bent to form aligned hooks 70 designed to accommodate the heating cable 59.

The bracket member 65 is attached to the body of the hanger prior to its insertion into the rain gutter 21. The cross member 69 is threaded through the aperture 71 which was formed by bending the hook 342 from the top panel 35 of the channel-shaped member 34 and then turning the bracket 65 so as to extend at right angles to the hanger body 34, the shoulders 72 on the cross member 69 engaging the under surface of the top panel 34. When the heating cable 59 is engaged in the hook shaped member 70, the heating cable may extend vertically or even more than vertically if it is necessary. In view of the fact that the body portions of the hangers B and D are entirely alike, it is only necessary for the person mounting the supports to use the additional bracket 65 in the event it becomes necessary.

FIG. 12 of the drawings shows another means for supporting the hangers such as B if the heating cables can not be relied upon for this purpose. FIG. 12 shows an elongated pliable strip 74 having a cross member 75 at one end. The strip 74 is preferably provided with holes 76 for attaching means.

This device operates much in the manner of the structure shown in FIGS. 9 and 10. The cross member 75 is inserted through the opening 71 formed by the formation of the hook 42 and then turning the cross member until it engages the under surface of the panel 35 on opposite sides of the aperture. The strip 74 is then bent to conform with the edge of the roof, and is held in place by nails or other suitable securing means.

In accordance with the Patent Statutes, I have described the principles of construction and operation of my Heating Cables, and while I have endeavored to set forth the best embodiments, I desire to have it understood that obvious changes may be made within the scope of the following claims without departing from the spirit of my invention.

I claim:

1. A heating cable support for use in combination with a rain gutter having an inner wall and an outer wall comprising:
   a support member adaptable to be secured to at least one side of a rain gutter, said support member extending toward the other side of the rain gutter;
   means located on said support member, said means adapted to accommodate portions of a heating cable in a predetermined location so that the heating cable can melt ice adjacent thereto, said means including an upwardly projecting hook directed toward the outer wall of the rain gutter;
   further means adapted to accommodate portions of a heating cable, said further means including at least one strip extending downwardly from said support member, a bottom portion connected to the lower end of said downwardly extending portion of said strip, and an upwardly extending flange secured to said bottom portion in spaced relation to said downwardly extending portion, said further means being spaced from said support member so that the heating cable can melt ice adjacent thereto, said means and said further means being spaced from the inner wall, the outer wall and the bottom of said rain gutter to thereby provide support for a heating cable above the bottom of the rain gutter and within the inner and outer walls of the rain gutter.

2. The structure of claim 1 and including flanges at opposite ends of said support member engageable with opposite sides of a rain gutter.

3. The structure of claim 1 and in which said support member is generally channel-shaped in cross section.

4. The structure of claim 3 and in which said means is formed of portions struck from said support member.

* * * * *